(12) United States Patent
Eckert et al.

(10) Patent No.: US 12,001,042 B2
(45) Date of Patent: Jun. 4, 2024

(54) OPTICAL BODY INCLUDING MULTILAYER OPTICAL FILM AND THIN ADHESIVE LAYER

(71) Applicant: 3M INNOVATIVE PROPERTIES COMPANY, St. Paul, MN (US)

(72) Inventors: Karissa L. Eckert, Ham Lake, MN (US); Michelle L Toy, North St. Paul, MN (US); Adam D. Haag, Woodbury, MN (US); Matthew B. Johnson, Woodbury, MN (US); Albert I. Everaerts, Tucson, AZ (US); Quinn D. Sanford, Mosinee, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/878,347

(22) Filed: Aug. 1, 2022

(65) Prior Publication Data

US 2022/0373728 A1 Nov. 24, 2022

Related U.S. Application Data

(62) Division of application No. 16/619,155, filed as application No. PCT/US2018/036008 on Jun. 5, 2018, now abandoned.

(Continued)

(51) Int. Cl.
*G02B 5/30* (2006.01)
*C09J 7/29* (2018.01)
(Continued)

(52) U.S. Cl.
CPC .............. *G02B 5/305* (2013.01); *C09J 7/29* (2018.01); *C09J 201/02* (2013.01); *B32B 2037/1253* (2013.01); *B32B 2307/40* (2013.01); *B32B 2307/42* (2013.01); *B32B 2307/538* (2013.01); *B32B 2457/20* (2013.01);
(Continued)

(58) Field of Classification Search
None
See application file for complete search history.

(56) References Cited

U.S. PATENT DOCUMENTS 3,610,729 A 10/1971 Rogers
4,446,305 A 5/1984 Rogers et al.
(Continued)

FOREIGN PATENT DOCUMENTS

JP 2005276306 A2 10/2005
JP 2015221891 A2 12/2015
(Continued)

OTHER PUBLICATIONS

3M Display Solutions for Tablets, 3M Display Materials & Systems Division, 2018, 6 pp.
(Continued)

*Primary Examiner* — Eli D. Strah
(74) *Attorney, Agent, or Firm* — Clifton F. Richardson

(57) ABSTRACT

Optical bodies are described. In particular, optical bodies having a birefringent multilayer optical film and a continuous adhesive layer with a thickness less than 20 micrometers are described. Optical bodies described herein exhibit reduced occurrence and severity of a non-uniformity defect known as "orange peel."

6 Claims, 4 Drawing Sheets

Related U.S. Application Data

(60) Provisional application No. 62/515,407, filed on Jun. 5, 2017.

(51) Int. Cl.
  *C09J 201/02* (2006.01)
  *B32B 37/12* (2006.01)
  *C09J 133/00* (2006.01)
  *C09J 133/08* (2006.01)

(52) U.S. Cl.
  CPC ....... *B32B 2457/202* (2013.01); *C09J 133/00* (2013.01); *C09J 133/08* (2013.01); *C09J 2301/302* (2020.08); *C09K 2323/03* (2020.08); *C09K 2323/031* (2020.08); *C09K 2323/05* (2020.08); *C09K 2323/057* (2020.08); *C09K 2323/06* (2020.08); *C09K 2323/061* (2020.08)

(56) References Cited

U.S. PATENT DOCUMENTS

| | | | |
|---|---|---|---|
| 4,540,623 | A | 9/1985 | Im et al. |
| 5,448,404 | A | 9/1995 | Schrenk et al. |
| 5,882,774 | A | 3/1999 | Jonza et al. |
| 6,088,159 | A | 7/2000 | Weber et al. |
| 6,096,375 | A | 8/2000 | Ouderkirk et al. |
| 6,352,761 | B1 | 3/2002 | Hebrink et al. |
| 7,104,776 | B2 | 9/2006 | Merrill et al. |
| 9,864,207 | B2 | 1/2018 | Ouderkirk et al. |
| 2002/0122252 | A1 | 9/2002 | Hebrink et al. |
| 2003/0071938 | A1 | 4/2003 | Hamamoto et al. |
| 2005/0122587 | A1 | 6/2005 | Ouderkirk et al. |
| 2006/0246296 | A1 | 11/2006 | Xia et al. |
| 2006/0291055 | A1 | 12/2006 | Gehlsen et al. |
| 2007/0035681 | A1 | 2/2007 | Okada et al. |
| 2007/0047080 | A1 | 3/2007 | Stover et al. |
| 2008/0152837 | A1 | 6/2008 | Chien et al. |
| 2011/0102891 | A1 | 5/2011 | Derks et al. |
| 2013/0160938 | A1* | 6/2013 | Yasui .................. C09J 7/385 427/163.1 |
| 2013/0216805 | A1 | 8/2013 | Yasui et al. |
| 2013/0321915 | A1 | 12/2013 | Chien et al. |
| 2014/0160405 | A1 | 6/2014 | Huh et al. |
| 2014/0204317 | A1 | 7/2014 | Huh et al. |
| 2014/0242303 | A1 | 8/2014 | Lee et al. |
| 2015/0219919 | A1* | 8/2015 | Ouderkirk ............ G02B 27/285 359/489.09 |
| 2015/0338563 | A1 | 11/2015 | Kiuchi et al. |
| 2015/0378077 | A1 | 12/2015 | Haag et al. |
| 2016/0306086 | A1 | 10/2016 | Haag et al. |
| 2017/0003514 | A1 | 1/2017 | Ouderkirk et al. |
| 2017/0017117 | A1 | 1/2017 | Shimizu et al. |
| 2017/0023716 | A1 | 1/2017 | Kitagawa et al. |

FOREIGN PATENT DOCUMENTS

| | | |
|---|---|---|
| WO | 1997001780 A1 | 1/1997 |
| WO | 1999036813 A1 | 7/1999 |
| WO | 2008149890 A1 | 12/2008 |
| WO | 20120785432 W | 6/2012 |
| WO | 2013082020 A1 | 6/2013 |
| WO | 2014065294 A1 | 5/2014 |
| WO | 2014130283 A1 | 8/2014 |
| WO | 2015141533 A1 | 9/2015 |
| WO | 2016205130 A1 | 12/2016 |

OTHER PUBLICATIONS

International Search Report for PCT International Application No. PCT/US2018/036008, dated Sep. 28, 2018, 9 pages.
MacLeod, Thin-Film Optical Filters, 2nd Ed., (1986), 5 pages.
Thelan, Design of Optical Interference Coatings, (1989), 5 pages.

* cited by examiner

US 12,001,042 B2

OPTICAL BODY INCLUDING MULTILAYER OPTICAL FILM AND THIN ADHESIVE LAYER

CROSS REFERENCE TO RELATED APPLICATIONS

This application is a divisional of U.S. application Ser. No. 16/619,155, filed Dec. 4, 2019, which is a national stage filing under 35 U.S.C. 371 of PCT/US2018/036008, filed Jun. 5, 2018, which claims the benefit of U.S. Application No. 62/515,407, filed Jun. 5, 2017, the disclosures of which are incorporated by reference in their entireties herein.

BACKGROUND

Optical bodies include at least one optical film or other optical component. Multilayer optical films are useful as either reflectors or reflective polarizers, and often include co-stretched alternating layers including birefringent polymers. Adhesives enable the adhering of certain components to other components including films, optical components, and substrates.

SUMMARY

In one aspect, the present description relates to optical bodies. In particular, the present description relates to optical bodies including a birefringent multilayer optical film, a continuous adhesive layer disposed on a first major surface of the birefringent multilayer optical film, and a polymeric liner disposed on the continuous adhesive layer. The continuous adhesive layer has a thickness less than 20 micrometers and includes an adhesive derived from a solution having a viscosity between 10 and 50,000 cps.

In another aspect, the present description relates to optical bodies. In particular, the present description relates to optical bodies including a birefringent multilayer optical film, a continuous adhesive layer disposed on a first major surface of the birefringent multilayer optical film, and a glass or plastic substrate layer attached to the multilayer optical film via the continuous adhesive layer. The optical body, measured through the glass or plastic substrate layer with an interferometer, has an Ra surface roughness of less than 40 nm.

In yet another aspect, the present description relates to methods of providing an optically smooth laminated optical body. In particular, the present description relates to providing an optically smooth laminated optical body by providing a birefringent multilayer optical film coated with a continuous adhesive layer having a thickness less than 20 micrometers and having a polymeric liner disposed on the continuous adhesive layer, by removing the polymeric liner, and by attaching the birefringent multilayer optical film and the continuous adhesive layer to a glass or plastic substrate layer to form an optically smooth laminated optical body. The optically smooth laminated optical body, measured through the glass or plastic substrate layer with an interferometer, has a Ra surface roughness of less than 40 nm.

DETAILED DESCRIPTION

Optical bodies may be useful in many applications. For example, optical bodies including a rigid substrate layer such as glass or plastic can be used in projection systems (for example, as a polarizing beam splitter or in a head up display system), virtual reality systems, or other applications where the stiffness or environmental stability of the substrate may be beneficial to the application.

Unfortunately, it has been previously difficult to laminate optical bodies to a substrate layer without introducing a non-uniformity defect that may be described as "orange peel." Orange peel may be observed either through reflection or transmission through the laminated optical body. For sensitive optical applications, such orange peel non-uniformity may produce undesirable optical artifacts in the optical systems such optical bodies are a part of. For example, orange peel in an optical body may make a projected image reflected off such an optical body appear wavy or non-uniform. Further, even excellent compliance with conventional web and roll handling best practices are not effective in eliminating or even substantially reducing orange peel.

Optical bodies described herein include features that surprisingly reduce orange peel when laminated to a substrate layer. Instead of careful handling, these features are physical differences in the optical body construction that result in smoother lamination and reduced orange peel in a finished laminated construction.

Figure 1:
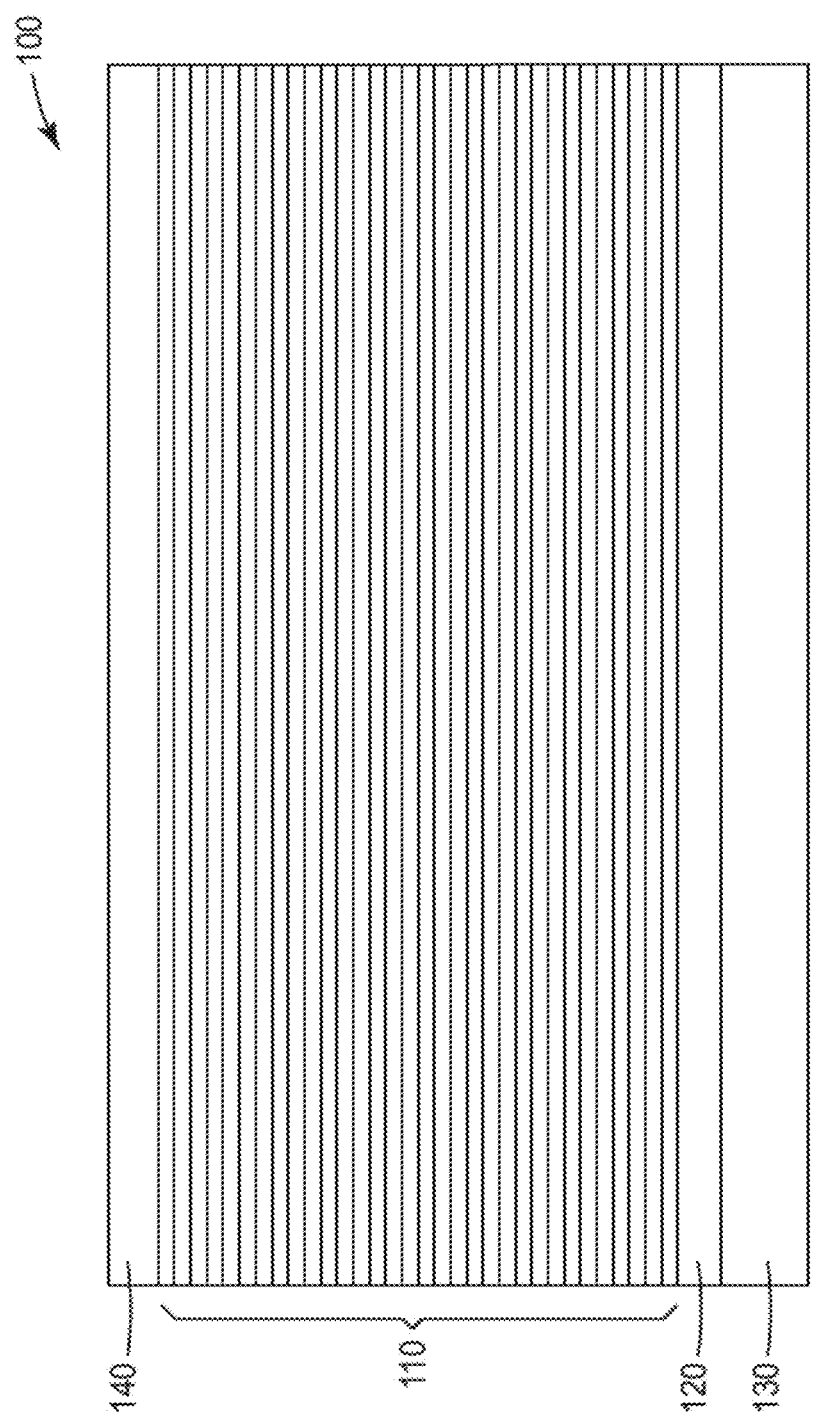
FIG. 1 is a schematic elevation view of an optical body.

FIG. 1 is a schematic elevation view of an optical body. Optical body 100 includes birefringent multilayer optical film 110, continuous adhesive layer 120, polymeric liner 130, and hardcoat layer 140.

Birefringent multilayer optical film 110 includes alternating microlayers of at least two different materials. Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters*, 2nd Ed., Macmillan Publishing Co. (1986) and by A. Thelan, *Design of Optical Interference Filters*, McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. Layers may be arranged generally as thinnest to thickest. In some embodiments, the arrangement of the alternating optical layers may vary substantially linearly as a function of layer count. These layer profiles may be referred to as linear layer profiles. Thicker layers may be included, such as skin layers at the outer surfaces of the multilayer optical film, or protective boundary layers (PBLs) disposed within the multilayer optical films, that separate coherent groupings (referred to herein as "packets") of microlayers. In some embodiments, birefringent multilayer optical film 110 may include at least two packets. In some embodiments, the two packets of the birefringent multilayer optical film have thicknesses that overlap by at least 80%. In some cases, the protective boundary layer may be the same material as at least one of the alternating layers of the multilayer optical film. In other cases, the protective boundary layer may be a different material, selected for its physical or rheological properties. The protective boundary layers may be on one side or one both sides of an optical packet. In the case of a single-packet multilayer optical film, the protective boundary layer may be on one or both external surfaces of the multilayer optical film.

Skin layers are sometimes added which occurs after the feedblock but before the melt exits the film die. The multilayer melt is then cast through a film die onto a chill roll in the conventional manner for polyester films, upon which it is quenched. The cast web is then stretched in different ways to achieve birefringence in at least one of the optical layers, producing in many cases either a reflective polarizer or mirror film, as has been described in, for example, U.S. Patent Publication No. 2007/047080 A1, U.S. Patent Publication No. 2011/0102891 A1, and U.S. Pat. No. 7,104,776 (Merrill et al.). The films, having birefringence, may be referred to as birefringent multilayer optical films.

Birefringent multilayer optical film 110 may have any suitable reflection characteristics. For example, birefringent multilayer optical film 110 may be a reflective polarizer preferentially reflecting light of one polarization while preferentially transmitting light of a second orthogonal polarization. In some embodiments, the birefringent multilayer optical film may include or be attached to a quarter-wave retarder to effectively form a circular reflective polarizer. The quarter-wave retarder may, in some embodiments, have a retardance within 50 nm of 137.5 nm for 550 nm light. In some embodiments, the quarter-wave retarder may be or include a birefringent stretched polymer film. In some embodiments, the quarter-wave retarder may be or include a liquid crystal layer. In some embodiments, the quarter-wave retarder may be achromatic over an extended wavelength range; that is, the quarter-wave retarder may provide approximately quarter-wave retardation over that extended wavelength range. In some embodiments, birefringent multilayer optical film 110 may be a mirror that reflects light of each orthogonal polarization. In some embodiments, birefringent multilayer optical film 110 reflects 40% of unpolarized light at normal incidence, reflects 50% of unpolarized light at normal incidence, reflects 60% of unpolarized light at normal incidence, reflects 70% of unpolarized light at normal incidence, reflects 80% of unpolarized light at normal incidence, reflects 90% of unpolarized light at normal incidence, or even reflects more than 95% of unpolarized light at normal incidence.

In some embodiments, the birefringent multilayer optical film is thick. In some embodiments, the birefringent multilayer optical film is thicker than 35 micrometers. In some embodiments, the birefringent multilayer optical film is thicker than 50 micrometers. In some embodiments, the birefringent multilayer optical film is thicker than 60 micrometers. The birefringent multilayer optical film may be any suitable shape or size, depending on the application. Commonly, the birefringent multilayer optical film in a laminated product is substantially rectangular, being converted from a roll of film. In some cases, the thickness of the birefringent multilayer optical film may improve the appearance and occurrence of orange peel.

In some embodiments, the birefringent multilayer optical film includes absorbing elements. In some embodiments, these absorbing elements are absorbing polarizing elements. In some embodiments, these absorbing elements are broadband absorbers, which absorb both orthogonal polarizations of light. In some embodiments, the absorbing polarizing elements may be disposed only within the high index layers of the birefringent multilayer optical film. Exemplary polarizers including absorbing elements are described in U.S. Patent Publication No. 2016-0306086 (Haag et al.) and U.S. Pat. No. 6,096,375 (Ouderkirk et al.).

Continuous adhesive layer 120 is disposed on a first major surface of birefringent multilayer optical film 110. Continuous adhesive layer may include any suitable adhesive or combination of adhesives. In some embodiments, continuous adhesive layer 120 includes optically clear adhesive. In some embodiments, continuous adhesive layer 120 includes acrylic or acrylate based adhesives. In some embodiments, continuous adhesive layer 120 includes polyurethane-, polyolefin-, polyester-, or silicone-based optically clear adhesives. In some embodiments, continuous adhesive layer 120 includes a coatable adhesive. Coatable adhesives may have a coating viscosity of between 10 and 50,000 cps. Such coatable adhesives permit the adhesive to be easily applied at a much lower thickness than is conventionally used (for example, using a dry lamination of a finished adhesive layer to the optical film), which has a surprisingly strong effect on the reduction of orange peel. However, the adhesive should be coated or other applied at such a thickness as to permit the application of a continuous layer. In some embodiments, the continuous adhesive layer has a thickness less than 20 micrometers. In some embodiments, the continuous adhesive layer has a thickness less than 15 micrometers. In some embodiments, the continuous adhesive layer has a thickness of less than 10 micrometers. In some embodiments, the continuous adhesive layer has a thickness of less than 5 micrometers. In certain applications, the optical bodies described herein are subjected to extreme environmental conditions. For example, certain optical bodies may be used in automotive applications, where components may have to survive without failure temperatures of 120° C. In these applications, selection of a crosslinked adhesive to prevent oozing, creep, or other failure due to high temperature may be desirable.

The adhesive layer may be a fully cured (i.e. crosslinked) adhesive or it may be partially crosslinked or even not crosslinked prior to lamination to the substrate layer. Once applied, the adhesive layer could be subsequently crosslinked, such as by simple radiation treatment (UV, e-beam, gamma), thermal exposure (for example, using a thermally activated crosslinker), exposure to moisture (for example if a silane functional crosslinker is used), and combinations thereof.

Polymeric liner 130 may be any suitable thickness and composition. Polymeric liner 130 is typically attached temporarily to the other side of continuous adhesive layer 120, opposite birefringent multilayer optical film 110, in order to protect the adhesive layer during storage, transport, and converting. In some embodiments, polymeric liner 130 may be hazy or even include pigment in order to easily identify the side having the adhesive. In some embodiments, the polymeric liner may be heat set or pre-shrunk in order to prevent warping or curling during environmental cycling, including during storage and transportation. In some embodiments, polymeric liner 130 may have low surface energy or include a low surface energy treatment in order to be easily removable. Suitable films for polymeric liner 130 may include oriented polyethylene terephthalate. In some embodiments, optically smooth polymeric liners may be used to maintain optical smoothness during processing.

Hardcoat layer 140 is provided on the birefringent multilayer optical film opposite the continuous adhesive layer and the polymeric liner, and may be any suitable hardcoat layer with any suitable thickness and hardness. Hardcoat layers and coatings are well known in the film processing layer and suitable hardcoat materials may be selected based on the desired application, process conditions, and other characteristics. In some embodiments, hardcoat layer 140 measured in combination with the birefringent multilayer optical film only may have a pencil hardness of 2H or harder. In some embodiments, hardcoat layer 140 may have a pencil hardness of HB or harder. In some embodiments, the hardcoat layer surprisingly improves the occurrence and severity of orange peel on a final laminated optical body. In some embodiments, the hardcoat layer may include one or more ultraviolet light absorbers. In some embodiments, one or more optional protective film layers may be disposed on the hardcoat layer (not illustrated). Such a protective film may be a polymeric layer, including a polyester such as polyethylene terephthalate.

Figure 2:
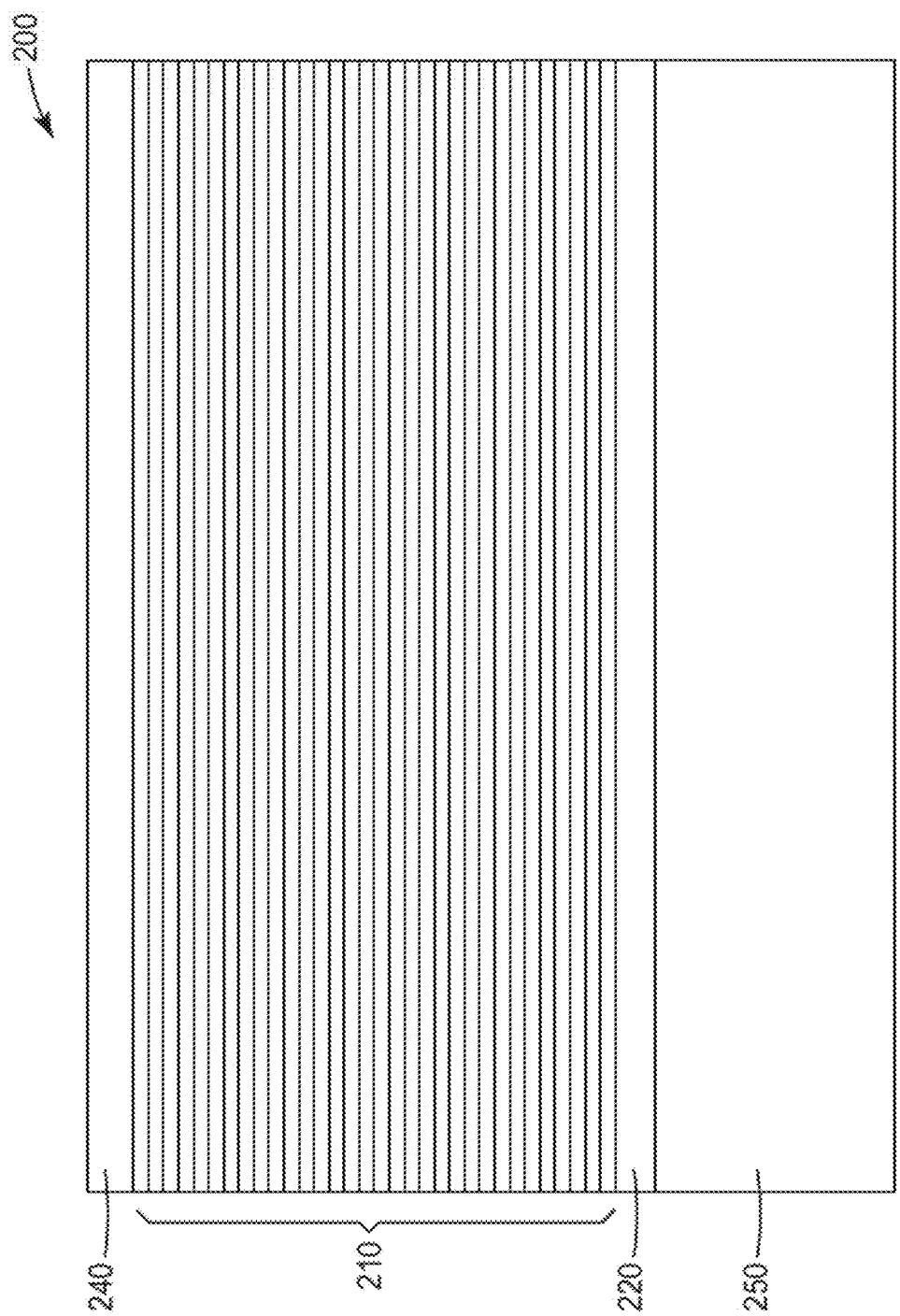
FIG. 2 is a schematic elevation view of another optical body.

FIG. 2 is a schematic elevation view of another optical body. Optical body 200 includes birefringent multilayer optical film 210, continuous adhesive layer 220, hardcoat layer 240, and substrate layer 250. Optical body 200 in FIG. 2 may essentially correspond to optical body 100 in FIG. 1, except that the polymeric liner has been removed and the rest of optical body 100 has been attached or laminated to substrate layer 250.

Substrate layer 250 may be any suitable substrate. In many applications, substrate layer 250 is or includes plastic or glass. Any suitable plastic, such as polycarbonate or acrylic, or any suitable glass, such as soda-lime glass or borosilicate glass, may be used. In some embodiments, substrate layer 250 is selected for optical properties, such as transparency (for example, greater than 90% transmission of light and less than 5% haze). In some embodiments, substrate layer 250 is selected for physical properties, such as warp resistance, moisture impermeability, stiffness, shatter resistance, or others. The thickness of substrate layer 250 depends on the particular application, but may range in certain cases from several millimeters to several centimeters thick.

Figure 3:
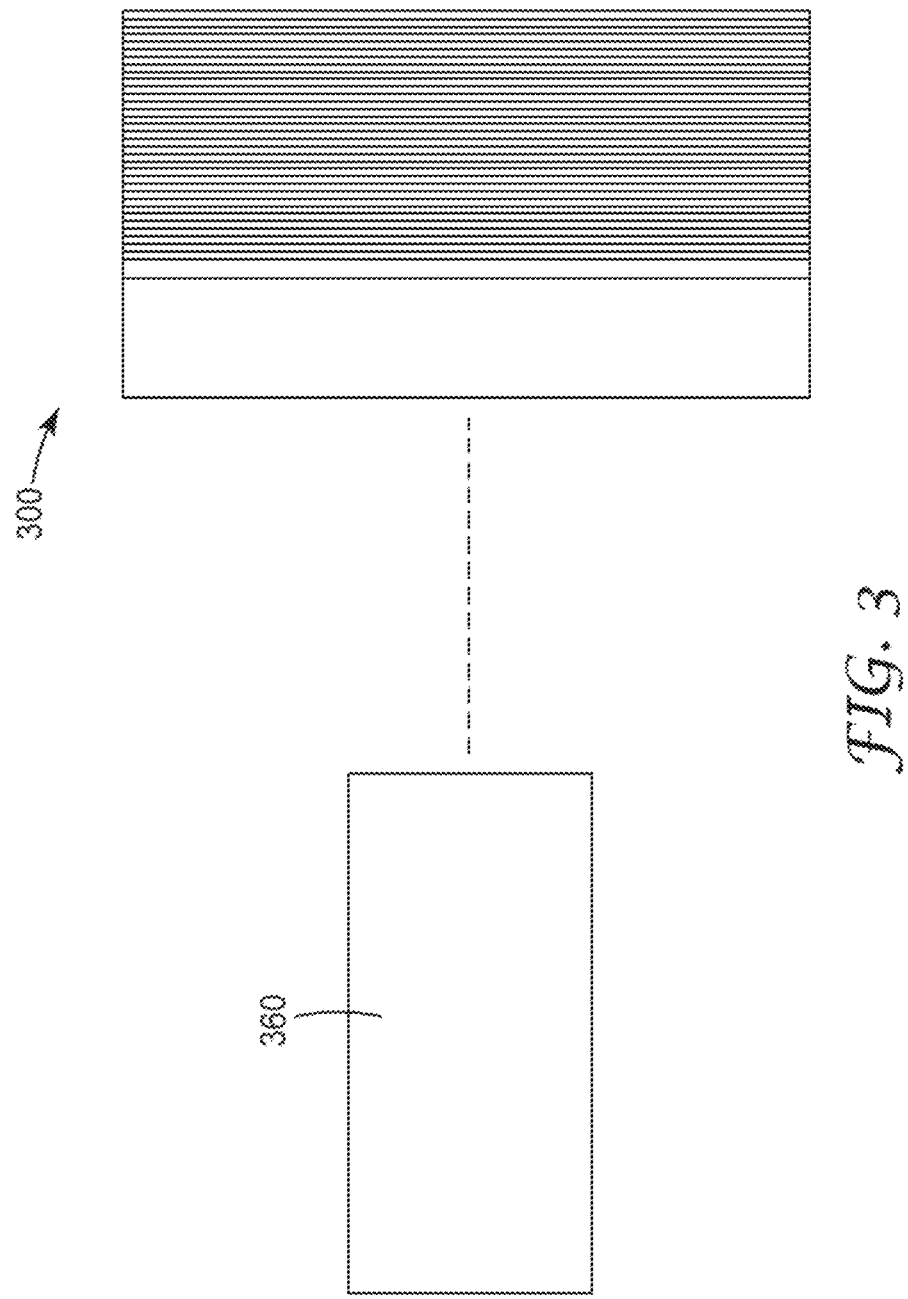
FIG. 3 is a schematic view illustrating the measurement of surface roughness for certain optical bodies.

FIG. 3 is a schematic view illustrating the measurement of surface roughness for certain optical bodies. The surface roughness of optical body 300 is being measured by an interferometer. Interferometers, such as the ZYGO NEWVIEW 8000 (available from Zygo Corporation, Middlefield, Conn.), are able to measure surface roughness which was found to be an objective measurement corresponding reasonably well to the subjective perception of orange peel. The interferometer and the optical body 300 are configured such that the interferometer measures the surface roughness of optical body 300 through the substrate layer.

Optical bodies made in accordance with the description herein may have surface roughness (Ra) of less than 40 nm, less than 30 nm, less than 20 nm, or even less than 10 nm. Alternative measurements of surface roughness, for example, peak-to-valley, or root-mean-square, may be used as well. Acceptable peak-to-valley surface roughness values may be less than 250 nm, less than 200 nm, less than 100 nm, or even less than 50 nm. Acceptable root-mean-square surface roughness values may be less than 50 nm, less than 40 nm, less than 20 nm, or even less than 10 nm.

In some embodiments, optical bodies as described herein may be useful in certain projection systems. In some embodiments, optical bodies as described herein may be useful is mirror display systems, where the optical body would be disposed on the front side (toward a viewer) of an emissive or liquid crystal display panel.

Descriptions for elements in figures should be understood to apply equally to corresponding elements in other figures, unless indicated otherwise. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

EXAMPLES

The following examples compare a conventionally formed birefringent reflective polarizer (CE-1) with a mirror surface reflective polarizer (Example 1). The examples further compare a conventional integrated absorbing-reflective polarizer (CE-2) with a mirror surface absorbing-reflective polarizer. Testing results for optical smoothness, environmental stability and optical properties for each example follow.

Materials/Source
RF02N is a release liner available from SKC Haas (Shenzhen City, China)
RF32N is a release liner available from SKC Haas (Shenzhen City, China)
APF-V4 and APF-T35 are reflective polarizer films available from 3M Company, St. Paul, Minn.

Comparative Example (CE-1)

A birefringent reflective polarizer with conventional surface was prepared as follows. Three multilayer optical film packets were co-extruded as described in the example of U.S. Pat. No. 6,088,159. Two polymers were used for the optical layers. The first polymer (first optical layers) was polyethylene naphthalate (PEN) homopolymer (100 mol % naphthalene dicarboxylate with 100 mol % ethylene glycol) having a Tg of 121-123 degrees centigrade. The second polymer (second optical layers) was a first polyethylene naphthalate copolymer (coPEN) having 55 mol % naphthalate and 45 mol % terephthalate as carboxylates and 95.8 mol % ethylene glycol, 4 mol % hexane diol, and 0.2 mol % trimethylol propane as glycols, having a Tg of 94 degrees centigrade. The polymer used for the skin layers was a second coPEN having 75 mol % naphthalate and 25 mol % terephthalate as carboxylates and 95.8 mol % ethylene glycol, 4 mol % hexane diol, and 0.2 mol % trimethylol propane as glycols, having a Tg of 101 degrees centigrade.

These polyesters can be formed, for example, as described in U.S. Pat. No. 6,352,761 (Hebrink et al.).

The PEN and first coPEN polymers were fed from separate extruders to a multilayer coextrusion feedblock, in which they were assembled into a packet of 275 alternating optical layers, plus a thicker protective boundary layer of the coPEN, on each side, for a total of 277 layers. From the feedblock, the multilayer melt was conveyed through one three-fold layer multiplier, resulting in a construction having 829 layers. The skin layers of the second coPEN were added to the construction in a manifold specific to that purpose, resulting in a final construction having 831 layers. The multilayer melt was then cast through a film die onto a chill roll, in the conventional manner for polyester films, upon which it was quenched. The cast web was then stretched in a commercial scale linear tenter at temperatures and draw profiles similar to those described in Example 2 of U.S. Patent Publication No. 2007-0047080 (Stover et al).

Following production of this multilayered film, the film had a resulting physical thickness as measured by a capacitance gauge of approximately 92 µm as measured using Ono-Sokki DG-925 Micrometer (Yokohama, Japan).

After stretching, the first packet possessed only reflective polarizer functionality. In process of making the film, a standard polyethylene type premask produced by Tredegar under tradename 'ULTRAMASK 1035' (Richmond, Va.) was used to laminate to the surface of the reflective polarizer for purposes of protecting film and winding into jumbo roll.

Example 1

A reflective polarizer mirror film was prepared as follows. A two multilayer optical packets were co-extruded as described in U.S. Patent Publication 2011-0102891 (Derks et al.), with exceptions as follows. The first optical layers of the first and second packets were comprised of a blend of polyethylene naphthalate (PEN) homopolymer (100 mol % naphthalene dicarboxylate with 100 mol % ethylene glycol) having a Tg of 121-123 degrees centigrade. The second optical polymer layers of the first and second packets were a blend of polycarbonate and copolyesters (PC:coPET) such that the index is about 1.57 and remains substantially isotropic upon uniaxial orientation, wherein the PC:coPET molar ratio is approximately 42.5 mol % PC and 57.5 mol % coPET and has a Tg of 105 degrees centigrade. The polymer used for the skin layers were comprised of the same material used in the second optical layers.

The materials were fed from separate extruders to a multilayer coextrusion feedblock, in which they were assembled into a first packet of 325 alternating optical layers and a second packet also of 325 alternating layers. The skin layers were added to the construction in a manifold specific to that purpose, resulting in a final construction having 656 layers. The multilayer melt was then cast through a film die onto a chill roll, in the conventional manner for polyester films, upon which it was quenched. The cast web was then stretched in a commercial scale linear tenter at temperatures and draw profiles similar to those described in Example 2 of U.S. Patent Publication 2007-0047080 (Stover et al). The film was measured for physical thickness by a capacitance gauge to be approximately 63 µm as measured using the Ono-Sokki DG-925 Micrometer.

Figure 4:
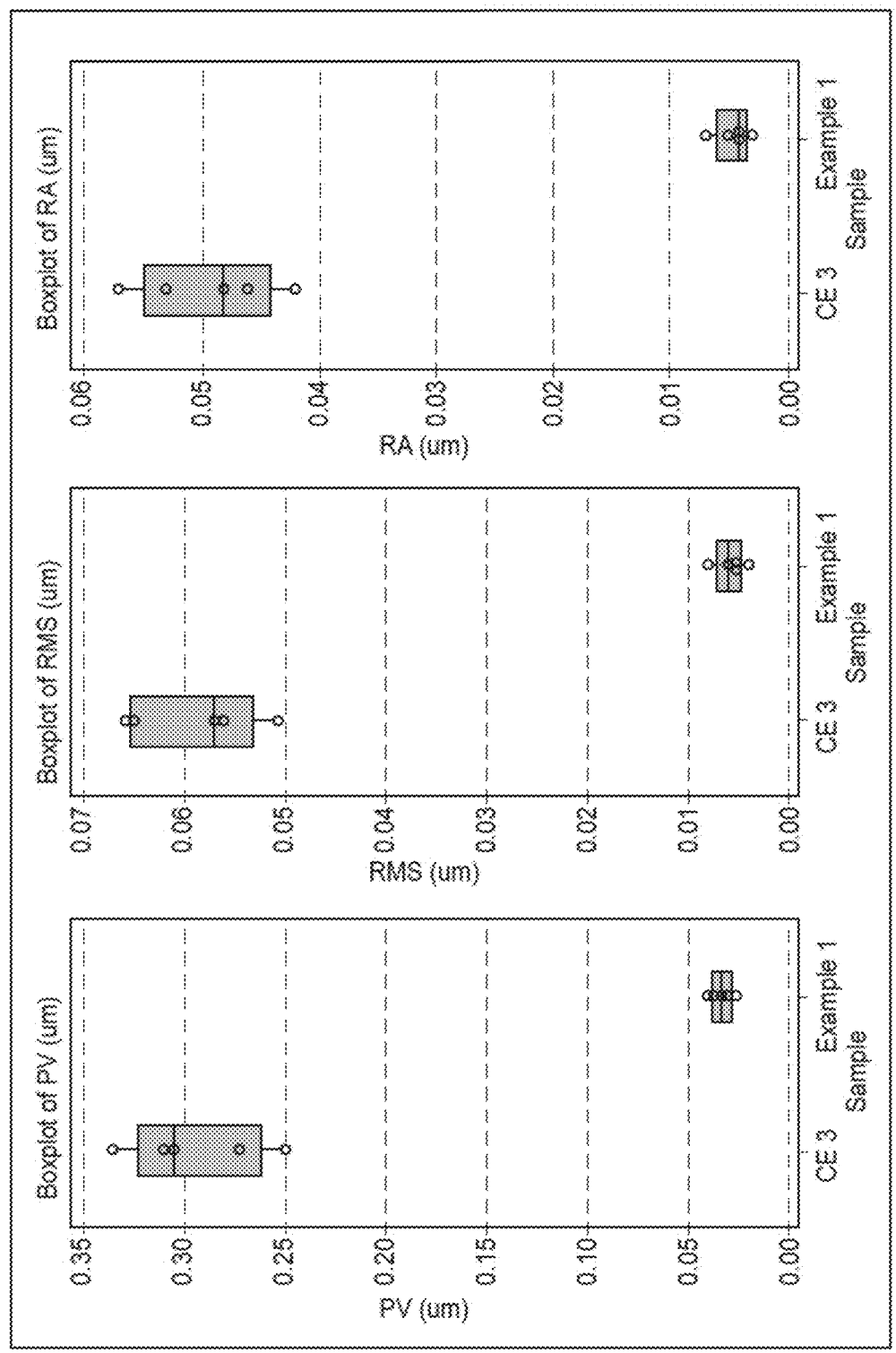
FIG. 4 is a box plot comparing optical smoothness for Example 1 and Comparative Example 3.

In process of making the reflecting polarizer mirror film, optically smooth premask available from Sun A. Kaken (Tokyo, Japan) under tradename NSA33T was applied to the surface of the integrated polarizer for purposes of protecting film and maintaining the optically smooth character of the film as measured and displayed in FIG. 4.

Following winding either CE-1 or Example 1 into roll form, they were laminated with adhesive coated with 3M OCA labelled OCA-2. This OCA-2 material was made according to Example 1 of U.S. Patent Publication 2006-0246296 (Xia et al.) using 10 parts of additive I and 90 parts of PSA 1 (solids) with the exception that instead of 0.1 parts bisamide/100 parts of dry adhesive, 0.15 parts bisamide was used. OCA-2 and release liner (RF02N available from SKC Haas, Shenzhen, China) were applied via a clean solvent coating line. This provided an adhesive layer onto the integrated polarizer for enabling it to be used in various applications.

To accomplish this lamination, the OCA-2 was first coated on RF02N release liner to a (dry) thickness of 2 µm to 30 µm using an extrusion coating method. The resulting adhesive coating was subsequently dried at oven temperatures ranging between 110° C. and 160° C. until the majority of solvent had been removed from the coating. The film (either CE-1 or Example 1) was then laminated onto the release liner with adhesive.

Comparative Example 2 (CE-2)

An integrated absorbing-reflective polarizer made by conventional means was prepared as follows. A single multilayer optical packet was co-extruded as described in US Patent Publication 2011-0102891 (Derks et al.), with exceptions as follows. The first optical layers were comprised of a blend of polyethylene naphthalate (PEN) homopolymer (100 mol % naphthalene dicarboxylate with 100 mol % ethylene glycol) having a Tg of 121-123 degrees centigrade and four different dichroic co-extrudable absorbing dyes (PD-325H, PD-335H, PD-104 and PD-318H available from Mitsui Fine Chemical of Japan, Tokyo, Japan), as described in U.S. Patent Publication No. 2015-0378077 (Haag et al.). The dye weight percentage utilized in Example 1 were as follows: PD-325H=1.67 wt %, PD-335H=0.21 wt %, PD-104=0.67 wt %, and PD-318H=1.25 wt %. The second polymer (second optical layers) were a blend of, which was made with a blend of PEN and and PETG such that the index is about 1.60 and remains substantially isotropic upon uniaxial orientation, wherein weight ratio is approximately 45 wt % LmPEN and 55 PETG and has a Tg of 100 degrees centigrade. The polymer used for the 'air' side skin layer was comprised of a blend of 90/10 coPEN, a polymer composed of 90% polyethylene naphthalate (PEN) and 10% polyethylene terephthalate (PET). The polymer used for the 'wheel' side skin was comprised of a blend of polyethylene naphthalate (PEN) homopolymer (100 mol % naphthalene dicarboxylate with 100 mol % ethylene glycol) having a Tg of 121-123 degrees centigrade and four different dichroic co-extrudable absorbing dyes (PD-325H, PD-335H, PD-104 and PD-318H, available from Mitsui Fine Chemical of Japan, Tokyo, Japan), as described in U.S. Patent Publication No. 2015-0378077 (Haag et al.). The dye weight percentages utilized for the wheel side skin in Example 1 were as follows: PD-325H=0.93 wt %, PD-335H=0.35 wt %%, PD-104=0.56 wt %, and PD-318H=0.41 wt %.

The materials were fed from separate extruders to a multilayer coextrusion feedblock, in which they were assembled into a packet of 305 alternating optical layers. The skin layers of the first optical layer material were added to the construction in a manifold specific to that purpose, resulting in a final construction having 307 layers. The multilayer melt was then cast through a film die onto a chill roll, in the conventional manner for polyester films, upon which it was quenched. The cast web was then stretched in a commercial scale linear tenter at temperatures and draw profiles similar to those described in U.S. Patent Publication No. 2007-0047080 A1 (Stover et al) Example 2. The film was measured for physical thickness by a capacitance gauge to be approximately 65 μm as measured using the Ono-Sokki DG-925 Micrometer.

Example 2

An integrated absorbing-reflective polarizer with mirror finish example was prepared as follows. Two multilayer optical packets were co-extruded as described in US Patent Publication 2011-0102891 (Derks et al.), with exceptions as follows. The first optical layers of the first packet were comprised of a blend of polyethylene naphthalate (PEN) homopolymer (100 mol % naphthalene dicarboxylate with 100 mol % ethylene glycol) having a Tg of 121-123 degrees centigrade and four different dichroic co-extrudable absorbing dyes (PD-325H, PD-335H, PD-104 and PD-318H, available from Mitsui Fine Chemical of Japan, Tokyo, Japan), as described in U.S. Patent Publication No. 2015-0378077 (Haag et al.). The dye weight percentage utilized in Example 1 were as follows: PD-325H=1.67 wt %, PD-335H=0.21 wt %, PD-104=0.67 wt %, and PD-318H=1.25 wt %. The second optical polymer layers of the first packet were a blend of, which was made with a blend of polycarbonate and copolyesters (PC:coPET) such that the index is about 1.57 and remains substantially isotropic upon uniaxial orientation, wherein the PC:coPET molar ratio is approximately 42.5 mol % PC and 57.5 mol % coPET and has a Tg of 105 degrees centigrade. The polymer used for the 'air' side skin layer was comprised of a blend of 90/10 coPEN, a polymer composed of 90% polyethylene naphthalate (PEN) and 10% polyethylene terephthalate (PET). The polymer used for the 'wheel' side skin (or the film-casting side) was comprised of a blend of polyethylene naphthalate (PEN) homopolymer (100 mol % naphthalene dicarboxylate with 100 mol % ethylene glycol) having a Tg of 121-123 degrees centigrade and four different dichroic co-extrudable absorbing dyes (PD-325H, PD-335H, PD-104 and PD-318H, available from Mitsui Fine Chemical of Japan, Tokyo, Japan), as described in U.S. Patent Publication No. 2015-0378077 (Haag et al.). The dye weight percentages utilized for the film casting side skin in Example 2 were as follows: PD-325H=0.93 wt %, PD-335H=0.35 wt %%, PD-104=0.56 wt %, and PD-318H=0.41 wt %.

The first optical layers of the second packet were comprised of a blend of polyethylene naphthalate (PEN) homopolymer (100 mol % naphthalene dicarboxylate with 100 mol % ethylene glycol) having a Tg of 121-123 degrees centigrade. The second optical polymer layers of the second packet were a blend of, which was made with a blend of polycarbonate and copolyesters (PC:coPET) such that the index is about 1.57 and remains substantially isotropic upon uniaxial orientation, wherein the PC:coPET molar ratio is approximately 42.5 mol % PC and 57.5 mol % coPET and has a Tg of 105 degrees centigrade. The polymer used for the 'air' side skin layer was comprised of a blend of 90/10 coPEN, a polymer composed of 90% polyethylene naphthalate (PEN) and 10% polyethylene terephthalate (PET). The polymer used for the air side skin was comprised of a blend of polyethylene naphthalate (PEN) homopolymer (100 mol % naphthalene dicarboxylate with 100 mol % ethylene glycol) having a Tg of 121-123 degrees centigrade.

The materials were fed from separate extruders to a multilayer coextrusion feedblock, in which they were assembled into a first packet of 305 alternating optical layers and a second packet also of 305 alternating layers. The skin layers of the first optical layer material were added to the construction in a manifold specific to that purpose, resulting in a final construction having 307 layers. The multilayer melt was then cast through a film die onto a chill roll, in the conventional manner for polyester films, upon which it was quenched. The cast web was then stretched in a commercial scale linear tenter at temperatures and draw profiles similar to those described in Example 2 of U.S. Patent Publication No. 2007-0047080 A1 (Stover et al). The film was measured for physical thickness by a capacitance gauge to be approximately 65 μm. After stretching the first packet possessed absorbing polarizer functionality while the second optical packet possessed reflective polarizer functionality. In process of making the integrated polarizer, optically smooth premask available from Sun A. Kaken (Tokyo, Japan) under tradename NSA33T was applied to the surface of the integrated polarizer for purposes of protecting film and maintaining the optically smooth character of the film as measured and displayed in FIG. 4.

Comparative Example 3 (CE-3)

The polarizer was purchased as Sanitz 5618 H-Type polarizer (Tokyo, Japan) using adhesive provided with product. This material served as comparative example for environmental performance relative to examples with resultant data provide in Tables 1 and 2.
Test Results
Optical Smoothness Test An advantage of constructions described herein is to provide visually mirror-like surfaces devoid of subtle imperfections referred to as orange-peel. This perceived visual flaw may be subjectively ranked by expert viewers, but also tends to correlate well with measureable parameters of the surface characteristic roughness. Optical surface characteristics were measured using a Zygo interferometer model NV5000-5032 (available from Zygo Corporation, Middlefield, Conn.)

To make these measurements, example films were first laminated to glass plates. The Zygo interferometer reported values for peak-to-valley (PV), RMS and Ra [micrometers] were recorded for CE-1 and Example 1 with results compared in FIG. 4. Example 1 demonstrated peak-to-valley roughness of 35 nm which is less than 1/10 of the wavelength of light in visible spectrum, whereas the comparative example (CE-1) measured 260-320 nm.
Effective Transmission Test The effective transmission was measured for each of the optical assemblies prepared. A polytetrafluoroethylene cube with walls about 0.6 cm thick and about 11 cm on a side was provided. The cube was illuminated from its interior via a high intensity fiber-optic light pipe. The highly diffusing translucent walls of the cube provided reference surfaces of highly uniform (Lambertian) luminance. A luminance meter, centered relative to an external cube face and positioned along a normal to the cube face, recorded the luminance on the cube face with and without each of the samples provided between the luminance meter and the cube face. The ratio of the luminance with the sample included to that without the sample included is the effective transmission. The effective transmission "gain" is then calculated as the ratio of the sample measurement to the baseline measurement. Gain measurements were re-taken after intervals of environmental exposures to track changes to the effective transmission gain and this change in gain ratio is tabled as "Δ Gain" where Δ Gain=(gain after exposure)/(initial gain).

Color Change Test (ΔE)

The measurement for color change uses Minolta CM3500d camera (Minolta Co, Ltd.) to measure color (L*, a*, b*) of transmitted light with and without the multilayer optical film samples. The light source for the measurement is industry standard D65/10 source for color measurements and the color change (ΔE) is then calculated based on the Japan Industry Standards detailed in K7103 and K7105. The results for ΔE are listed in Tables 1-3.

Environmental Exposure Test

These optically smooth reflecting and integrated polarizer articles have applicability in industrial markets where polarization and use temperature are required to be maintained vs conventionally available products. To that end, environmental exposure tests follow.

Table 1 shows data comparing Example 1 with Comparative Example 3 for high temperature and high humidity aging (250 hours at 85° C./85% relative humidity). Table 2 shows data comparing Example 1 and Comparative Example 3 for very high temperature (250 hours at 120° C.). In both comparisons, Example 1 construction has superior optical property retention to the environmental exposure. In these results, Example 1 was subjected to aging environments with a variety of optically clear adhesives and subsequent construct laminated to glass. The adhesives used included 3M 8146, which is a commercially available optically clear adhesive (OCA) available from 3M Company, St. Paul, Minn. The second OCA adhesive, labelled OCA-2, was made as described previously under Example 1. The replicate indicates multiple copies of the same sample configurations. So, for example, Example 1 laminated with 8146/A is duplicated in Example 1 laminated with 8146/B. The resulting samples were comprised sequentially of glass, optically clear adhesive and multilayer optical film. As such, each sample had a "glass side" and a "film side" as indicated in the following tables.

TABLE 1

| | | | Δ Gain | | | | Δ E* | |
|---|---|---|---|---|---|---|---|---|
| | | | Film side towards light source | Glass side towards light source | | | Film side towards light source | Glass side towards light source |
| Sample | OCA | Replicate | | | Δ T | Δ H | | |
| Example 1 | 8146 | A | 1.0080 | 0.9919 | 0.2000 | 1.3300 | 0.272 | 0.270 |
| | | B | 0.9977 | 0.9951 | 0.4000 | 1.0700 | 0.193 | 0.263 |
| | OCA-2 | C | 0.9969 | 0.9958 | 0.4000 | 0.8400 | 0.309 | 0.269 |
| Comparative Example 3 | x | A | 0.7506 | 1.0599 | 4.8000 | 1.3500 | 4.440 | 4.419 |
| | x | B | 1.0590 | 1.0682 | 9.1000 | 2.1800 | 8.253 | 8.163 |

Δ Gain = (gain after exposure/gain prior to exposure), Δ T = ΔTransmission (%), Δ H = ΔHaze(%), and Δ E = color change through 250 hours at 85° C./85% RH.

TABLE 2

| | | | Δ Gain | | | | Δ E* | |
|---|---|---|---|---|---|---|---|---|
| | | | Film side towards light source | Glass side towards light source | | | Film side towards light source | Glass side towards light source |
| Sample | OCA | Replicate | | | Δ T | Δ H | | |
| Example 1 | 8146 | A | 0.9868 | 0.9897 | −0.8000 | 1.6900 | 0.474 | 0.404 |
| | | B | 0.9832 | 0.9828 | −0.8000 | 1.3800 | 0.499 | 0.458 |
| | OCA-2 | E | 0.9859 | 0.9890 | −0.4000 | 0.4000 | 0.363 | 0.411 |
| Comparative Example 3 | x | A | 1.0039 | 1.0019 | 0.5000 | 1.1400 | 5.721 | 5.711 |
| | x | B | 1.0030 | 0.9962 | 0.2000 | 0.8500 | 5.731 | 5.821 |

Δ Gain = (gain after exposure/gain prior to exposure), Δ T = ΔTransmission (%), Δ H = ΔHaze(%), and Δ E = color change through 250 hours at 120° C.

Further aging of Example 1 and Example 2 as compared to Comparative Example 2 have been carried out for longer periods of time and results are listed in Table 3. The results show improved thermal robustness with optically smooth surfaces for improved optical reflectivity polarizers.

TABLE 3

| Sample | Replicate | Δ Gain Film side towards light source | Δ Gain Glass side towards light source | Δ T | Δ H | ΔE* Film side towards light source | ΔE* Glass side towards light source |
|---|---|---|---|---|---|---|---|
| Example 2 | A | 0.9574 | 0.9816 | −0.20 | 1.07 | 0.724 | 0.792 |
| | B | 0.9669 | 0.9848 | 0.20 | 2.07 | 0.736 | 0.711 |
| CE-2 | A | 0.9728 | 1.0836 | −29.77 | 7.71 | 2.951 | 2.898 |
| | B | 1.0038 | 1.1208 | −29.67 | 8.90 | 3.020 | 3.068 |
| Example 1 | A | 0.9722 | 0.9597 | 0.60 | 1.77 | 0.962 | 1.353 |
| | B | 0.9725 | 0.9694 | 1.00 | 2.08 | 1.542 | 1.647 |

Δ Gain = (gain after exposure/gain prior to exposure), Δ T = ΔTransmission (%), Δ H = ΔHaze(%), and Δ E = color change through 1000 hours at 120° C.

Optical Properties Test

Lastly, as shown in Table 4, Example 1 is compared against commercially available reflective polarizer films (APF-V4 and APF-T35) for various optical properties using PerkinElmer LAMBDA 1050 (available from PerkinElmer, Waltham, Mass.) with wavelength range from 425 nm to 750 nm. As can be seen, Example 1 has superior reflectivity in both polarized light and transmitted light as well as polarization efficiency.

TABLE 4

| Sample replicate/ orientation | | % Reflection, Polarized input light | % Transmission, Polarized input light | Polarization Efficiency 425-750 nm RT [%] |
|---|---|---|---|---|
| Example 1 | A block | 98.13 | 0.33 | |
| | A pass | 10.15 | 89.95 | |
| | B block | 98.11 | 0.39 | |
| | B pass | 10.28 | 89.84 | |
| | C block | 98.17 | 0.32 | |
| | C pass | 10.04 | 90.07 | |
| | Average Block | 98.14 | 0.35 | 99.617 |
| | Average Pass | 10.16 | 89.95 | |
| APF-V4 | A block | 91.44 | 7.12 | |
| | A pass | 11.34 | 89.69 | |
| | B block | 92.33 | 6.87 | |
| | B pass | 10.74 | 89.75 | |
| | C block | 91.31 | 7.27 | |
| | C pass | 11.00 | 89.70 | |
| | Average Block | 91.69 | 7.09 | 92.388 |
| | Average Pass | 11.03 | 89.71 | |
| APF-T35 | A block | 96.67 | 2.35 | |
| | A pass | 10.51 | 89.66 | |
| | B block | 96.40 | 2.41 | |
| | B pass | 10.89 | 89.66 | |
| | C block | 96.31 | 2.42 | |
| | C pass | 10.95 | 89.52 | |
| | Average Block | 96.46 | 2.40 | 97.361 |
| | Average Pass | 10.79 | 89.62 | |

Reflective comparison against commercially available reflective polarizer films (APF-V4 and APF-T35 from 3M Company). Polarization efficiency data are average value 425-750 nm.

The following are exemplary embodiments according to the present disclosure:

Item 1. An optical body, comprising:
  a birefringent multilayer optical film;
  a continuous adhesive layer disposed on a first major surface of the birefringent multilayer optical film; and
  a polymeric liner disposed on the continuous adhesive layer;
  wherein the continuous adhesive layer has a thickness less than 20 micrometers and includes an adhesive derived from a solution having a viscosity between 10 and 50,000 cps.

Item 2. The optical body of item 1, further comprising a hardcoat layer on the birefringent multilayer optical film on a second major surface opposite the first major surface.

Item 3. The optical body of item 1, wherein the birefringent multilayer optical film is thicker than 35 micrometers.

Item 4. The optical body of item 1, wherein the birefringent multilayer optical film is thicker than 50 micrometers.

Item 5. The optical body of item 1, wherein the birefringent multilayer optical film is thicker than 60 micrometers.

Item 6. The optical body of item 1, wherein the birefringent multilayer optical film includes at least two optical packets, wherein the at least two optical packets have thicknesses that overlap by at least 80%.

Item 7. The optical body of item 1, wherein the adhesive of the continuous adhesive layer includes an acrylate adhesive.

Item 8. An optical body, comprising:
  a birefringent multilayer optical film;
  a continuous adhesive layer disposed on a first major surface of the birefringent multilayer optical film; and
  a glass or plastic substrate layer attached to the multilayer optical film via the continuous adhesive layer;
  wherein the continuous adhesive layer has a thickness less than 20 micrometers; and
  wherein the optical body, measured through the glass or plastic substrate layer with an interferometer, has an Ra surface roughness of less than 40 nm.

Item 9. The optical body of item 8, further comprising a hardcoat layer on the birefringent multilayer optical film on a second major surface opposite the first major surface.

Item 10. The optical body of item 8, wherein the optical body has an Ra surface roughness of less than 20 nm.

Item 11. The optical body of item 8, wherein the optical body has an Ra surface roughness of less than 10 nm.

Item 12. A polarizing beam splitter, comprising the optical body of item 8.

Item 13. A projection system, comprising:
  a projection engine having a light projection path; and
  the optical body of claim 8;
  wherein the light projection path includes passing through or bouncing off the optical body.

Item 14. A method of providing an optically smooth laminated optical body, the method comprising:
  providing a birefringent multilayer optical film coated with a continuous adhesive layer having a thickness less than 20 micrometers and having a polymeric liner disposed on the continuous adhesive layer;
  removing the polymeric liner;
  attaching the birefringent multilayer optical film and the continuous adhesive layer to a glass or plastic substrate layer to form an optically smooth laminated optical body;
  wherein the optically smooth laminated optical body, measured through the glass or plastic substrate layer with an interferometer, has an Ra surface roughness of less than 40 nm.

Item 15. The method of item 14, further comprising the step of curing the continuous adhesive layer.

Item 16. The method of item 14, wherein the optically smooth laminated optical body has an Ra surface roughness of less than 10 nm.

What is claimed is:

1. An optical body, comprising:
   a birefringent multilayer optical film;
   a continuous adhesive layer disposed on a first major surface of the birefringent multilayer optical film; and
   a glass or plastic substrate layer attached to the multilayer optical film via the continuous adhesive layer;
   wherein the continuous adhesive layer has a thickness less than 20 micrometers; and
   wherein the optical body, measured through the glass or plastic substrate layer with an interferometer, has a peak-to-valley surface roughness of less than 50 nm.

2. The optical body of claim 1, wherein the optical body, measured through the glass or plastic substrate layer with an interferometer, has an Ra surface roughness of less than 40 nm.

3. The optical body of claim 1, wherein the optical body, measured through the glass or plastic substrate layer with an interferometer, has an Ra surface roughness of less than 20 nm.

4. The optical body of claim 1, wherein the optical body, measured through the glass or plastic substrate layer with an interferometer, has an Ra surface roughness of less than 10 nm.

5. The optical body of claim 1, further comprising a hardcoat layer on the birefringent multilayer optical film on a second major surface opposite the first major surface.

6. A projection system, comprising:
   a projection engine having a light projection path; and
   the optical body of claim 1;
   wherein the light projection path includes passing through or bouncing off the optical body.

* * * * *